(12) United States Patent
Delgado-Nanez et al.

(10) Patent No.: US 12,476,579 B2
(45) Date of Patent: Nov. 18, 2025

(54) SOLAR MODULE RAIL COUPLINGS FOR SOLAR TRACKER

(71) Applicant: Nextracker LLC, Fremont, CA (US)

(72) Inventors: Ricardo Delgado-Nanez, San Jose, CA (US); Sri Rama Krishna Tammu, Andhra Pradesh (IN); Venkata Nitin Mythreya Yadlapalli, Nellore (IN)

(73) Assignee: NEXTRACKER LLC, Fremont, CA (US)

( * ) Notice: Subject to any disclaimer, the term of this patent is extended or adjusted under 35 U.S.C. 154(b) by 0 days.

(21) Appl. No.: 18/606,871

(22) Filed: Mar. 15, 2024

(65) Prior Publication Data
US 2024/0322747 A1    Sep. 26, 2024

Related U.S. Application Data

(60) Provisional application No. 63/468,412, filed on May 23, 2023, provisional application No. 63/453,462, filed on Mar. 20, 2023.

(51) Int. Cl.
*H02S 30/00* (2014.01)
*H02S 20/32* (2014.01)

(52) U.S. Cl.
CPC .................................. *H02S 20/32* (2014.12)

(58) Field of Classification Search
CPC . H02S 20/32; F24S 2025/6004; F24S 25/634; Y02E 10/47
See application file for complete search history.

(56) References Cited

U.S. PATENT DOCUMENTS

| | | | |
|---|---|---|---|
| 10,443,895 B1 * | 10/2019 | Cherukupalli | F24S 30/425 |
| 2017/0359017 A1 | 12/2017 | Corio | |
| 2019/0341878 A1 | 11/2019 | Watson et al. | |
| 2022/0271707 A1 * | 8/2022 | Reynolds | H02S 30/10 |
| 2022/0294386 A1 * | 9/2022 | Creasy | B21D 28/02 |
| 2024/0128920 A1 * | 4/2024 | de Fresart | H02S 20/23 |

FOREIGN PATENT DOCUMENTS

| | | |
|---|---|---|
| DE | 212021000313 U1 | 12/2022 |
| WO | 2022183204 A1 | 9/2022 |

OTHER PUBLICATIONS

International Searching Authority "International Search Report and Written Opinion" From PCT Application No. PCT/US2024/020197, Mailed Jul. 2, 2024, pp. 13.

* cited by examiner

*Primary Examiner* — Amy J. Sterling
(74) *Attorney, Agent, or Firm* — Fredrikson & Byron, P.A.

(57) ABSTRACT

A coupling system for use with a solar tracker includes a saddle defining a U-shaped profile extending between opposed first and second end portions, the saddle defines a channel configured to selectively receive a module rail and a slot defined through the first and second side surfaces adjacent the first end portion, and a clip assembly slidably supported within the channel and including a clip having a generally U-shaped profile defining a crown interposed between a pair of legs having an upturned tab and extending from the crown and terminating at a respective hook, wherein the clip assembly is configured to transition from a first open position to a second, closed position where the upturned tab is received within the slot of the saddle and a hook of each of the pair of legs engages a module rail to selectively couple the module rail to the saddle.

15 Claims, 8 Drawing Sheets

SOLAR MODULE RAIL COUPLINGS FOR SOLAR TRACKER

CROSS-REFERENCE TO RELATED APPLICATION

The present application claims the benefit of, and priority to, U.S. Provisional Patent Application Ser. No. 63/453,462, filed on Mar. 20, 2023, the entire content of which is hereby incorporated by reference in its entirety. The present application claims the benefit of, and priority to, U.S. Provisional Patent Application Ser. No. 63/468,412, filed on May 23, 2023, the entire content of which is hereby incorporated by reference in its entirety.

BACKGROUND

Technical Field

The present disclosure relates to solar power generation systems, and more particularly, to clamps and clamping systems for securing solar modules to a support structure.

Background of Related Art

Solar cells and solar panels are most efficient in sunny conditions when oriented towards the sun at a certain angle. Many solar panel systems are designed in combination with solar trackers, which follow the sun's trajectory across the sky from east to west in order to maximize the electrical generation capabilities of the systems. The relatively low energy produced by a single solar cell requires the use of thousands of solar cells, arranged in an array, to generate energy in sufficient magnitude to be usable, for example as part of an energy grid. As a result, solar trackers have been developed that are quite large, spanning hundreds of feet in length and including hundreds to thousands of individual solar modules that are mechanically coupled to support structures.

Coupling the numerous solar modules to the support structure requires a significant number of clamps or other mechanisms, each requiring a significant number of fasteners, driving up the cost of manufacturing each mechanism. As can be appreciated, assembling each of these mechanisms and securely tightening each fastener requires an enormous amount of time, contributing to increased cost and longer assembly time. The present disclosure seeks to address the shortcomings of prior tracker systems.

SUMMARY

In accordance with an aspect of the present disclosure, a coupling system for use with a solar tracker includes a saddle defining a U-shaped profile extending between a first end portion and a second, opposite end portion, the saddle defining a channel having an open upper portion and extending through each of the first end portion and the second end portion, the channel configured to selectively receive a module rail of a solar module, wherein a slot is defined through the first and second side surfaces adjacent the first end portion, and a clip assembly slidably supported within the channel of the saddle, the clip assembly including a clip having a generally U-shaped profile defining as crown interposed between a pair of legs, each of the pair of legs extending from the crown and terminating at a respective hook, wherein an upturned tab is disposed on each leg of the pair of legs, wherein the clip assembly is configured to transition from a first open position, to a second, closed position where an upturned tab of each leg of the pair of legs is received within the slot of the saddle and a hook of each leg of the pair of legs is received within a respective slot formed in the module rail to selectively couple the module rail to the saddle.

In aspects, the crown of the clip assembly may define an arcuate profile defining an apex extending into a gap formed between the pair of legs.

In certain aspects, each hook of the pair of legs may define a channel configured to receive a portion of the module rail, wherein when the clip assembly is placed in the second, closed position, the channel urges the module rail towards the saddle and inhibits movement of the module rail relative to the saddle.

In other aspects, the saddle may include a cutout defined through the first and second side surfaces of the saddle and adjacent the first end portion, the cutout extending in a direction transverse to a longitudinal axis defined through the first and second end portion and through an upper surface of the saddle, wherein the cutout permits an upper portion of the pair of legs of the clip to splay outwards and extend past a respective first side surface and second side surface of the saddle.

In certain aspects, the cutout of the saddle may extend away from the upper surface a distance permitting a tab of each respective leg of the pair of legs of the clip to extend past a respective first and second end surface of the saddle.

In aspects, the clip assembly may further include a pin operably coupled to the clip and slidably supported within the slot of the saddle, the pin defining a pair of opposed flanges inhibiting movement of the pin in a direction transverse to a longitudinal axis defined through the first and second end portions of the saddle.

In other aspects, the clip may define a pair of ears extending from each respective leg of the pair of legs extending in a direction away from the hooks, each ear of the pair of ears defining a bore for receipt of the pin.

In aspects, when in the first, open position, each leg of the pair of legs may be splayed in an outward direction where a distance between an upper portion of each leg of the pair of legs is greater than a length of the crown.

In certain aspects, when in the first, open position, the first leg of the pair of legs may be parallel to the second leg of the pair of legs.

In accordance with another aspect of the present disclosure, a clip for use with a coupling assembly of a solar tracker includes a crown defining an arcuate profile extending between a first end portion and a second, opposite end portion, a pair of splayed legs defining a gap for receipt of a module rail of a solar module, a first leg of the pair of splayed legs disposed on the first end portion and a second leg of the pair of splayed legs disposed on the second end portion, each leg of the pair of splayed legs extending from the crown and terminating at a hook extending into the gap, wherein each leg of the pair of splayed legs defines an upturned tab extending away from the gap and towards the hook, and a pair ears, a first ear disposed on a first leg of the pair of legs and a second ear disposed on a second leg of the pair of splayed legs, wherein the first ear is parallel to the second ear.

In aspects, each hook of the pair of splayed legs may define a channel for receipt of a portion of a module rail of a solar module.

In other aspects, each ear of the pair of ears may define a bore for receipt of a pin.

In certain aspects, the clip may comprise a unitary sheet of material, wherein the crown, the pair of splayed legs, the pair of ears, and the upturned tabs are integral to the unitary sheet of material.

In aspects, the clip may be formed from a resilient material.

In accordance with another aspect of the present disclosure, a coupling system for use with a solar tracker includes a saddle defining a U-shaped profile extending between a first end portion and a second, opposite end portion, an inner surface of the saddle defining a channel having an open upper portion and extending through each of the first end portion and the second end portion, wherein the inner surface of the saddle defines a pair of pockets wherein an inner dimension extending between the pair of pockets is greater than an inner dimension of the remaining portion of the channel, a clip assembly slidably supported within the channel of the saddle, the clip assembly including a clip having a generally U-shaped profile defining a crown interposed between a pair of legs, wherein a portion of each leg of the pair of legs is selectively received within a respective pocket of the pair of pockets, each leg of the pair of legs including an upturned tab, wherein the clip assembly is configured to transition from a first open position wherein each upturned tab is received within a respective pocket of the pair of pockets, to a second, closed position where each upturned tab is positioned within the remaining portion of the channel having a smaller inner dimension than the inner dimension extending between the pair of pockets.

In certain aspects, the saddle may include a slot formed through the first side surface and the second side surface, the slot configured to selectively receive the upturned tab of the pair of legs when the clip assembly is placed in the second, closed position.

In aspects, each leg of the pair of legs of the clip assembly may terminate at a hook extending into a gap formed between the pair of legs.

In other aspects, each hook of the pair of legs may define a channel for receipt of a module rail of a solar module.

In certain aspects, the crown may define an arcuate profile extending between the pair of legs.

In aspects, the pair of legs may be splayed in a direction extending from the crown.

BRIEF DESCRIPTION OF THE DRAWINGS

Various aspects and features of the present disclosure are described hereinbelow with reference to the drawings, wherein:

FIGS. 12-15 illustrate another embodiment of a coupling assembly provided in accordance with the present disclosure where one or more clip assemblies are integrated with the saddle component. FIG. 12 is a perspective view of the integrated saddle and clip component coupled to a torque tube via a strap assembly and decoupled from a module rail, while

DETAILED DESCRIPTION

The present disclosure is directed to a coupling assembly for use with a solar tracker. The coupling assembly described herein reduces the number of fasteners required to couple solar modules to a torque tube and reduces the amount of labor required to install and/or adjust solar modules on the torque tubes. The coupling assembly includes a saddle, a pair of clip assemblies slidably supported by the saddle, and a strap assembly rotatably supported by the pair of clip assemblies. The saddle is configured to be selectively coupled to a torque tube of a solar tracker via the strap assembly and is configured to be selectively coupled to a module rail, such as a FSLR series-7 (S7) of a photovoltaic solar module of the solar tracker via the pair of clip assemblies 50 to enable mounting of the solar modules on the torque tube. Although generally described as being used with an S7 module rail, it is envisioned that the coupling assembly may be utilized with any suitable solar module rail, such as a FSLR series-6, amongst others.

The saddle defines a generally U-shaped profile defining a channel for receipt of a module rail. A lower surface of the saddle defines a pair of protuberances disposed in spaced relation to one another. In this manner, the pair of protuberances define a gap for receipt of a torque tube of the solar tracker. The saddle defines a pair of slots through opposed side surfaces and adjacent a respective protuberance of the pair of protuberances. The pair of slots is oriented in a vertical direction (e.g., transverse to a longitudinal axis defined through opposed first and second end portions of the saddle). The pair of slots is configured to receive a corresponding pin of a clip assembly.

The clip assembly includes a clip and a pin operably coupled to the clip. The clip defines a generally U-shaped profile having a crown interposed between a pair of splayed legs. Although generally described as being splayed, it is envisioned that the pair of legs may define any suitable arrangement, including parallel, without departing from the scope of the present disclosure. The crown defines an arcuate profile extending between the pair of splayed legs, although it is contemplated that the crown may define any suitable profile, such as linear, curvilinear, combinations thereof, amongst others. Each of the pair of splayed legs terminates at a hook that extends within a gap formed between the pair of splayed legs and extends towards the crown. Each of the hooks is configured to be received within a respective slot formed within the module rail and defines a channel for selective receipt of a portion of the module rail. In this manner, as the clip assembly is transitioned from a first, open position, to a second, closed position, the hooks are received within respective slots of the module rail and urge the module rail towards the saddle to selectively couple the module rail to the saddle.

Each of the splayed legs defines an upturned flange that is configured to be received within a respective slot of the saddle when the clip assembly is placed in the second, closed position. As can be appreciated, the upturned flanges abut or otherwise contact an outer perimeter of the slot to inhibit movement of the module rail in a vertical or longitudinal direction. It is envisioned that an external force may be applied to the upturned flanges to release the upturned flanges from the slots of the saddle and permit adjustment or removal of the module rail relative to the saddle. An ear is disposed on each of the splayed legs which extends away from the hooks. The ears are disposed in a parallel relationship and define a bore for receipt of a pin of the clip assembly to slidably couple the clip assembly to the saddle. It is envisioned that the clip of the clip assembly may be formed from a unitary piece of sheet material or the like, and each of the hooks, upturned tabs, ears, may be formed from the unitary piece of sheet material using any suitable method such as stamping, forming, folding, combinations thereof, amongst others. As can be appreciated, it is envisioned that the clip may be formed from any suitable number of components and may be formed using any suitable method without departing from the scope of the present disclosure.

The pin defines a generally linear center portion extending between a pair of radial flanges. An outer dimension of the pair of radial flanges is greater than an external dimension of the linear center portion and greater than an internal dimension of the slots of the saddle. In this manner, the linear center portion is configured to be received within the bores of the ears of the clip and within the slots of the saddle and the pair of radial flanges inhibit the pin from being removed from the saddle.

The strap assembly includes a pair of straps, a t-bolt, a barrel, and a nut. The pair of straps each define a generally lazy "L" shaped profile extending between a pair of eyelets. The first eyelet is configured to receive the pin to rotatably support the strap on the saddle. The second eyelet of a first strap is configured to receive a portion of the t-bolt and the second eyelet of a second strap is configured to receive the barrel, which in turn, includes a bore to slidably receive a portion of the t-bolt. The pair of straps cooperate to define a gap for receipt of the torque tube. The strap assembly is configured to transition from a first, open position, where the torque tube is free to move relative to the saddle, to a second, closed position, where the torque tube is clamped or otherwise coupled to the saddle, by rotating the nut in a first direction to draw the second eyelets of the straps towards one another. As can be appreciated, rotating the nut in the first direction causes the first eyelet of each strap to pull or otherwise draw the pins of the clip assemblies towards the torque tube. Continued rotation of the nut in the first direction causes the hooks of the legs of the clip assembly to be received within the slots of the module rail and draw the module rail towards the saddle until the upturned tabs are received within the slots of the saddle. Further rotation of the nut in the first direction will clamp or otherwise inhibit movement of the module rail and the torque tube relative to the saddle.

It is envisioned that the saddle may define cutouts adjacent each end portion and extending through the opposed side surfaces. The cutouts permit an upper portion of each leg of the clip assembly, including the upturned tabs, to splay outwards and extend past the opposed side surfaces of the saddle. The cutouts provide a surface on which the upturned tabs can abut and cause the legs to compress or otherwise transition from the first, open position to the second, closed position. In embodiments, in lieu of the cutouts, the saddle may include a pair of pockets defined on an inner surface of the channel. An inner dimension extending between the pair of pockets is greater than an inner dimension of the remaining portion of the channel such that the upper portion of each leg of the clip assembly, including the upturned tabs is permitted to splay outward and be received within the pockets. The pair of pockets define a ledge that abuts or otherwise contacts the upturned tabs to cause the legs to compress or otherwise transition from the first, open position to the second, closed position. As can be appreciated, the pair of pockets protect the clip assemblies or otherwise inhibit external objects from contacting and damaging the clip assemblies. These and other aspects of the present disclosure will be described in detail hereinbelow with reference to the drawings.

Figure 1:
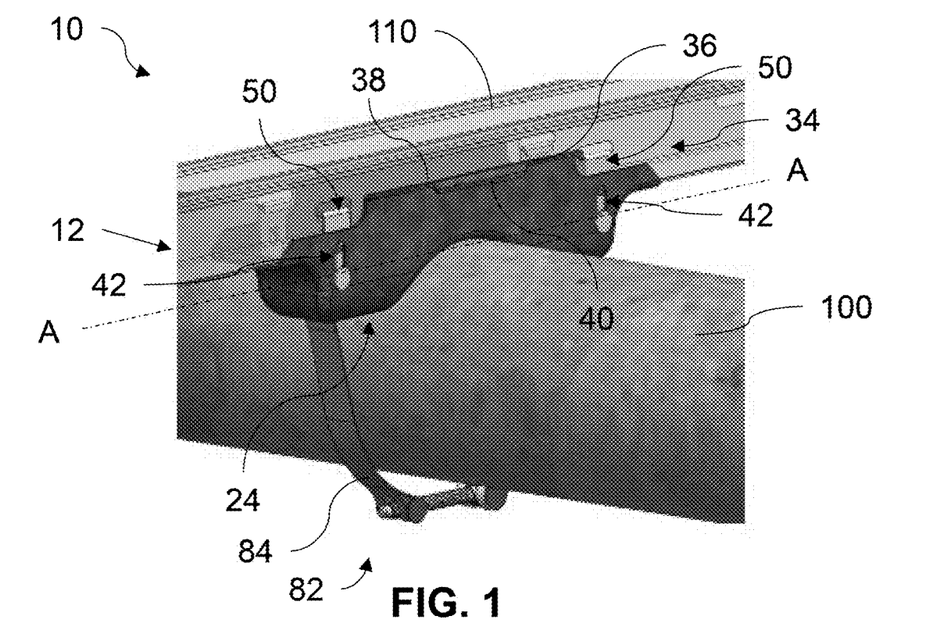
FIG. 1 is a perspective view of a coupling assembly provide in accordance with the present disclosure, shown coupled to a module rail and a torque tube.
Figure 2:
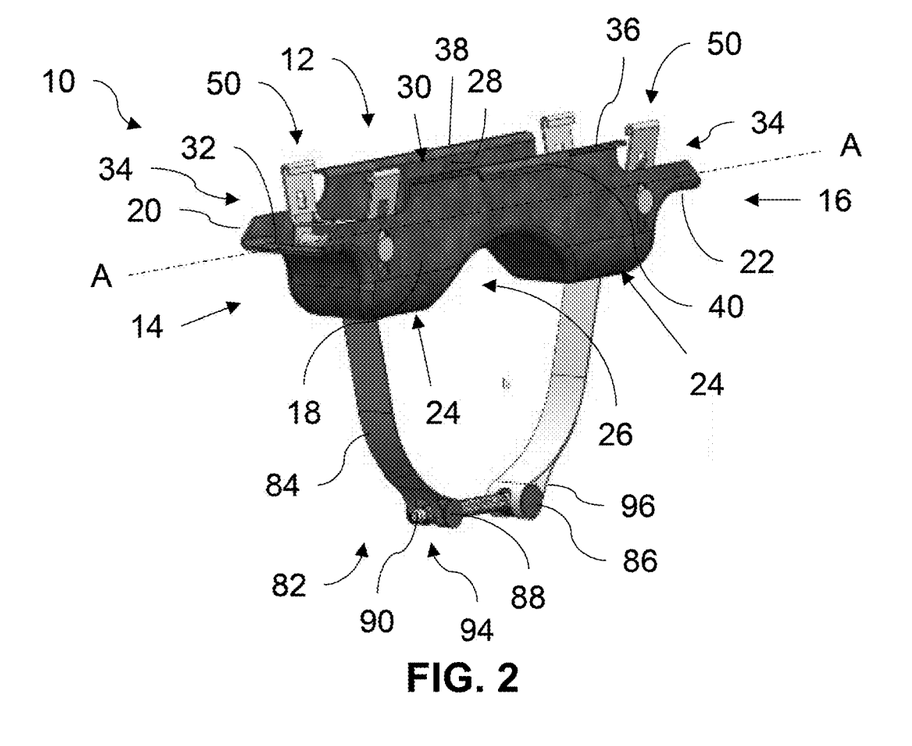
FIG. 2 is a perspective view of the coupling assembly of FIG. 1.
Figure 3:
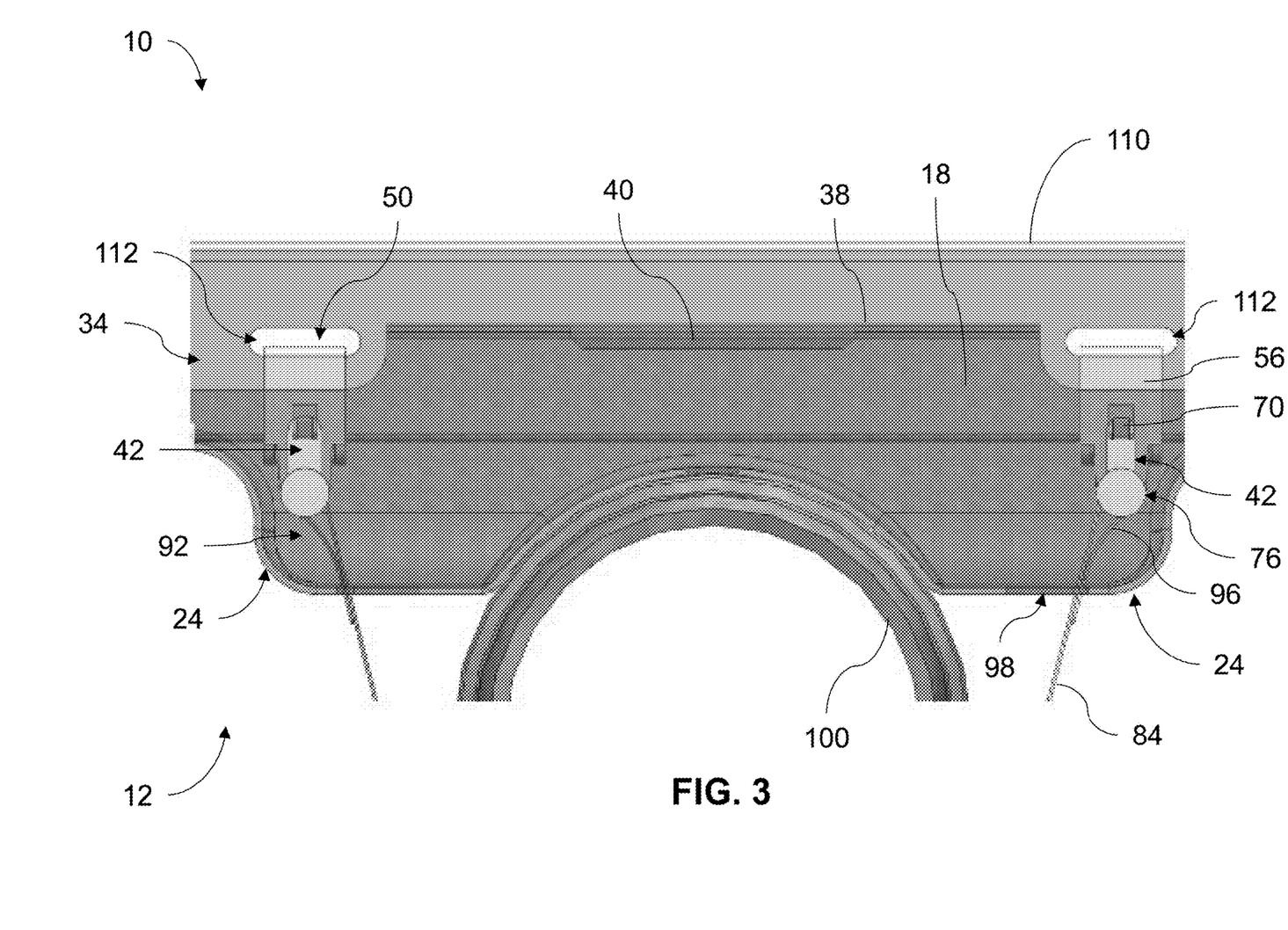
FIG. 3 is a side, elevation view of the coupling assembly of FIG. 1, shown coupled to the module rail and the torque tube.

Referring now to the drawings, FIGS. 1-3 illustrate a coupling assembly generally identified by reference numeral 10. The coupling assembly 10 includes a saddle 12, a pair of clip assemblies 50, and a strap assembly 82. As will be described in further detail hereinbelow, the saddle 12 is configured to be selectively coupled to a torque tube 100 of a solar tracker (not shown) via the strap assembly 82 and is configured to be selectively coupled to a module rail 110, such as a FSLR series-7 (S7) of a photovoltaic solar module (not shown) of the solar tracker via the pair of clip assemblies 50 to enable mounting of the solar modules on the torque tubes 100. Although generally described as being configured for use with S7 modules, it is envisioned that the coupling assembly 10 may be configured to use with any suitable solar module, such as FSLR series-6 modules, amongst others.

With continued reference to FIGS. 1-3, the saddle 12 defines a generally saddle type configuration defining a longitudinal axis A-A extending between a first end portion 14 and an opposite, second end portion 16. It is envisioned that the saddle 12 may include any suitable length (e.g., dimension extending along the longitudinal axis A-A between the first and second end portions 14, 16) depending upon the design needs of the coupling assembly 10. The saddle 12 includes a first side surface 18 and an opposite, second side surface 20 extending between each of the first and second end portions 14, 16 and a lower surface 22 extending between each of the first and second end portions 14, 16 and the first and second side surfaces 18, 20. A pair of protuberances 24 is disposed on the lower surface 22 extending in a downward direction (e.g., in the same direction in which the lower surface 22 is facing). The pair of protuberances 24 is disposed in spaced relation to one another along the longitudinal axis A-A and defines a gap 26 therebetween that is configured to receive a portion of a torque tube 100 therein. In this manner, when coupled to the coupling assembly 10, the torque tube 100 extends transverse to the longitudinal axis A-A.

Figure 8:
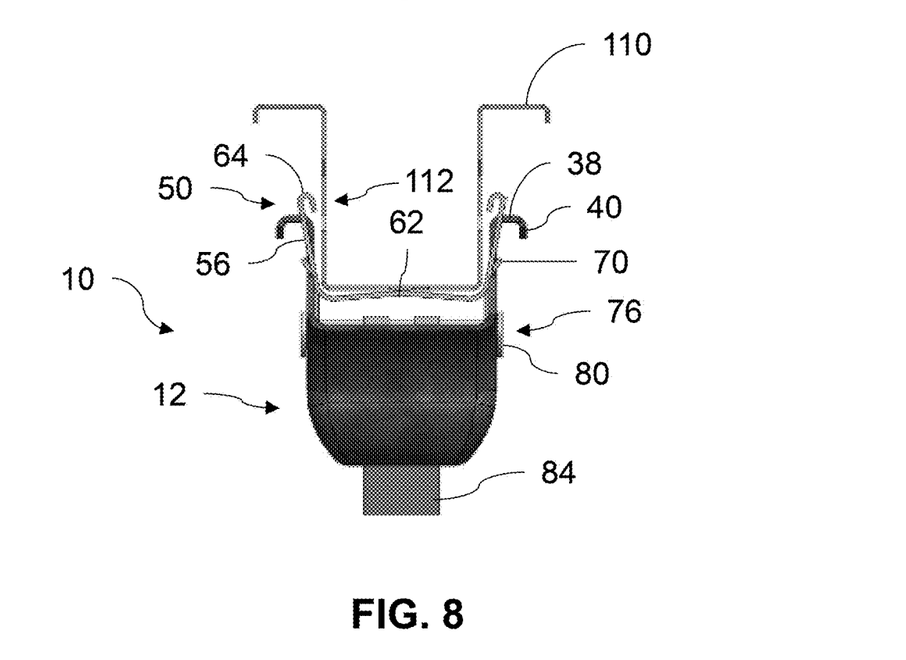
FIG. 8 is a side view of the coupling assembly of FIG. 1 shown with the clip assembly of FIG. 4 in the first, open position and the module rail of FIG. 1 partially advanced within the coupling assembly.
Figure 9:
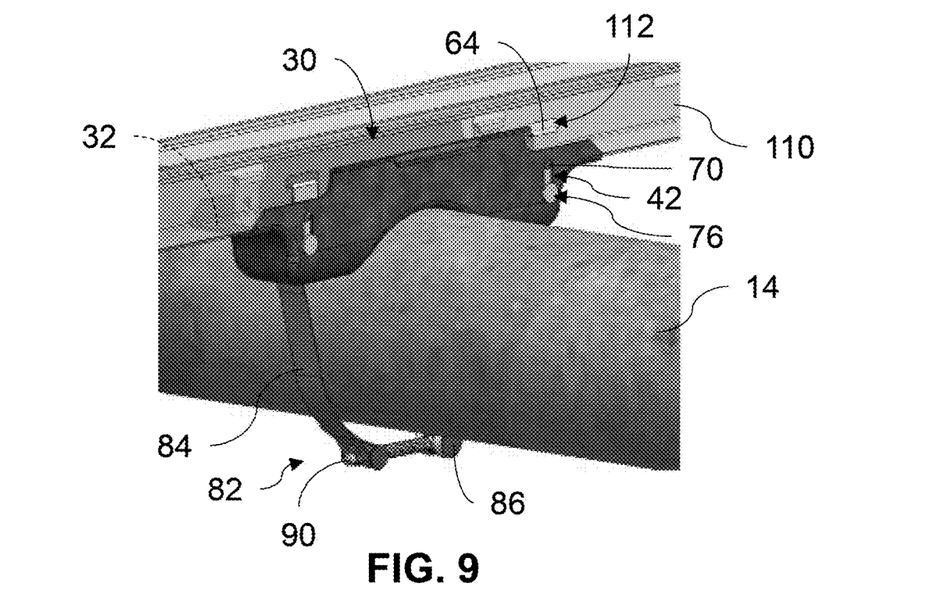
FIG. 9 is a perspective view of the coupling assembly of FIG. 1 shown with the clip assembly of FIG. 4 in the second, closed position and the module rail of FIG. 1 coupled to the coupling assembly.
Figure 10:
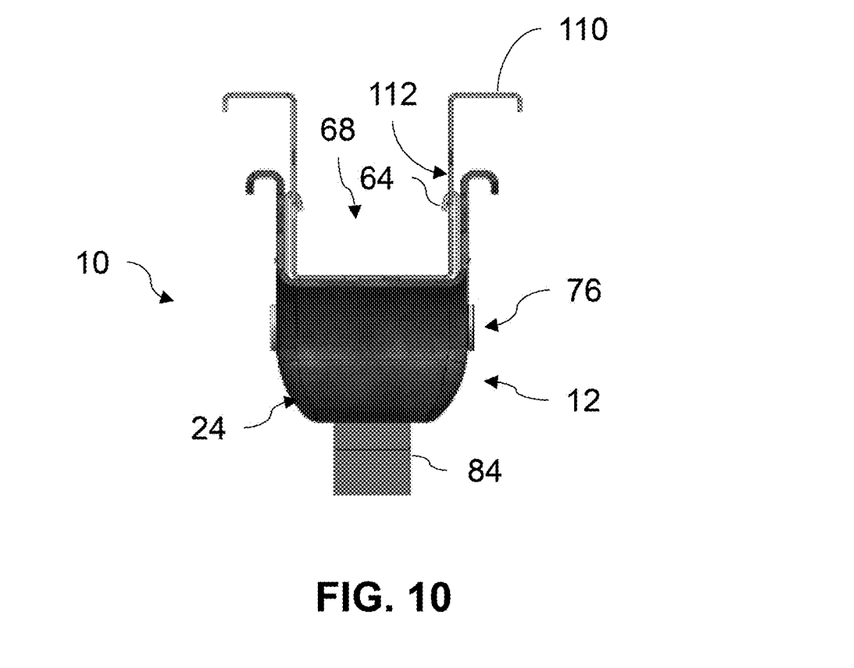
FIG. 10 is a side view of the coupling assembly of FIG. 1 shown with the clip assembly of FIG. 3 in the second, closed state and the module rail of FIG. 1 coupled to the coupling assembly.

The saddle 12 includes an inner surface 28 defining a cavity 30 therein and extending towards the lower surface 22. The cavity 30 includes an interior shape that is generally complimentary to the profile of the lower surface 22. In this manner, the inner surface 28 defines a generally planar 32 surface adjacent each of the first and second end portions 14, 16 that is configured to support or otherwise abut a portion of the module rail 110 of the solar module when the module rail 110 is seated within a portion of the cavity 30 (FIGS. 9 and 10). The saddle 12 includes a pair of cutouts or reliefs 34 defined through the first and second side surfaces 18, 20 of the saddle 12 adjacent each of the first and second end portions 14, 16. The pair of cutouts 34 is configured to provide clearance for or otherwise enable legs of the clip assemblies 50 to be placed in a first, open position (e.g., protrude past or splay past each of the first and second side surfaces 18, 20 (FIG. 8)). An upper portion of each of the first and second side surfaces 18, 20 defines a respective outturned flange 36. The outturned flanges 36 extend transverse to the longitudinal axis A-A and in a direction away from the first and second side surfaces 18, 20 (e.g., away from the cavity 30). Each of the outturned flanges 36 defines a generally planar top surface 38 that is configured to abut or otherwise support a solar module when the module rail 110 of the solar module is coupled to the coupling assembly 10. In embodiments, one or both of the outturned flanges 36 may include a downturned tab or ear 40 extending towards the lower surface 22 and in spaced relation to the respective first and second side surfaces 18, 20. Although generally illustrated as extending a portion of the length of the outturned flanges 36 (e.g., along the longitudinal axis A-A), it is envisioned that one or both of the downturned tabs 40 may extend any length of the outturned flanges 36, may be different lengths, or may be disposed at different locations along the longitudinal axis A-A without departing from the scope of the present disclosure. As can be appreciated, the downturned tabs 40 increase the stiffness or otherwise increase the bending resistance of the saddle 12.

With continued reference to FIGS. 1-3, the saddle 12 includes a pair of slots 42 extending through both the first and second side surfaces 18, 20 and disposed adjacent each of the pair of cutouts 34. Although generally illustrated as being disposed over the pair of protuberances 24, it is contemplated that the pair of slots 42 may be disposed at any location along the length of the pair of cutouts 34 (e.g., along the longitudinal axis A-A). In one non-limiting embodiment, the pair of slots 42 are disposed 200 mm from one another. Each slot of the pair of slots 42 extends in a direction that is transverse to the longitudinal axis A-A (e.g., in a direction from the lower surface 22 towards the top surface 38 of the outturned flanges) and is configured to slidably retain a respective pin of the pair of pins 76 of the clip assembly 50. Although generally described as being oriented in a vertical or transverse direction to the longitudinal axis A-A, it is contemplated that one or both of the pair of slots 42 may extend in any suitable direction, such as diagonal, horizontal, amongst others without departing from the scope of the present disclosure. As can be appreciated, it is envisioned that the saddle 12 may include any number of slots 42 disposed through the first and second side surface 18, 20 without departing from the scope of the present disclosure.

Figure 4:
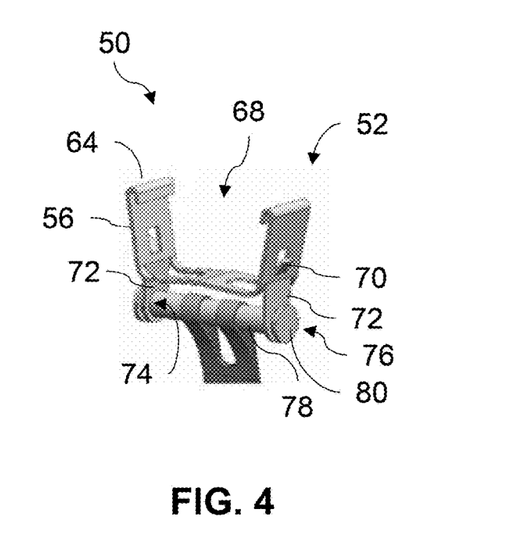
FIG. 4 is a perspective view of a clip assembly for use with the coupling assembly of FIG. 1.
Figure 5:
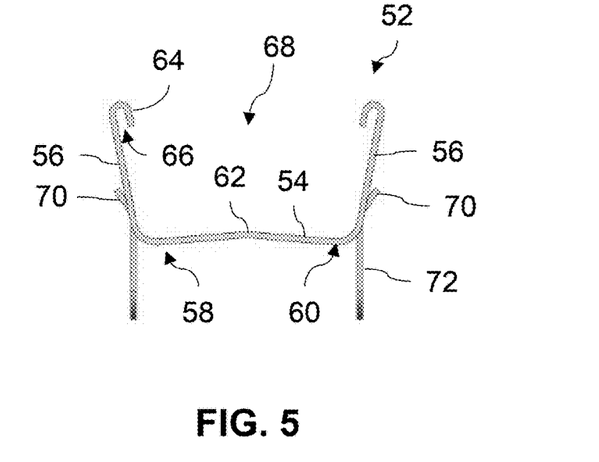
FIG. 5 is an elevation view of a clip of the clip assembly of FIG. 3 shown in a first, open position.
Figure 6:
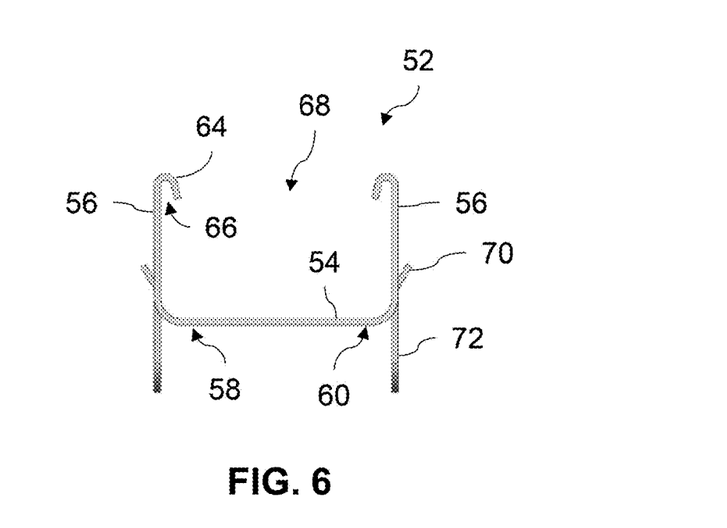
FIG. 6 is an elevation view of the clip of FIG. 5 shown in a second, closed position.

Continuing with FIGS. 1-3, and with additional reference to FIGS. 4-6, the clip assembly 50 includes a clip 52 and a pin 76 rotatably coupled to the clip 52. The clip 52 is configured to be transitioned from a first, open configuration (FIG. 5) to a second, closed or clamped configuration (FIG. 6) and defines a generally U-shaped profile having a crown 54 interposed between a pair of legs 56. When placed in the first, open configuration (FIG. 5), the crown 54 defines a generally arcuate profile when the extending between a first end portion 58 and an opposite second end portion 60. In this manner, a center portion of the crown 54 defines an apex 62, which, as can be appreciated, causes the crown 54 to act as a biasing element as will be described in further detail hereinbelow. The S7 PV module rail 110 consists of a sheet metal frame with multiple holes and slots. The mounting features of the S7 module rail 110 is a snap-fit or quick fit between the module rail 110 and the tracker rail without using any conventional or permanent fastening methods. Through-slots 112 are provided at 200 mm distance and 500 mm distance from a center portion of the module rail 110. It is envisioned that two slots 110 or all four slots 110 can be used for mounting purposes per rail.

Figure 7:
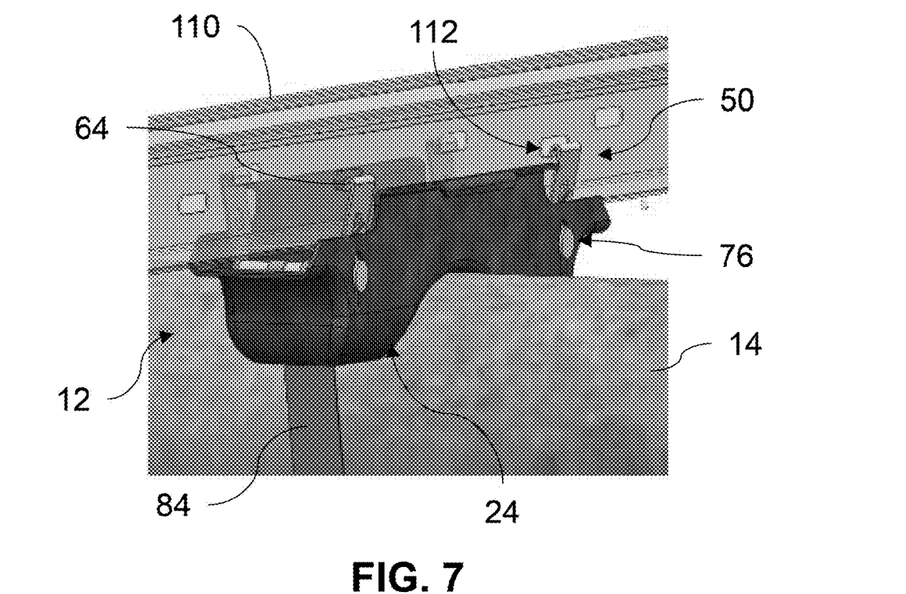
FIG. 7 is a perspective view of the coupling assembly of FIG. 1 shown with the clip assembly of FIG. 4 in the first, open position and the module rail of FIG. 1 partially advanced within the coupling assembly.

A first leg of the pair of legs 56 is coupled to the first end portion 58 of the crown 54 and the second leg of the pair of legs 56 is coupled to the second end portion 60 of the crown 54. In this manner, the pair of legs 56 is disposed in a mirrored configuration about the apex 62 of the crown 54. Each leg of the pair of legs 56 is substantially similar to one another and therefore, only one leg 56 will be described in detail herein in the interest of brevity. The leg 56 is coupled to, and extends from, the first end portion 58 of the crown 54 and terminates at a hooked or otherwise J-shaped configuration 64. In this manner, the hook 64 curves and extends back towards the crown 54 defining a channel 66 for receipt of a portion of the module rail 110 as will be described in further detail hereinbelow. When the clip 52 placed in the first, open position, the leg 56 is splayed outwards (e.g., away from the apex 62 of the crown 54) and defines a generally orthogonal angle relative to the first end portion 58 of the crown 54, although it is contemplated that the leg 56 may define any suitable angle relative to the crown 54. As can be appreciated, by being splayed outwards, the hook 64 of each leg of the pair of legs 56 is further apart from one another than a portion of each leg of the pair of legs 56 adjacent the crown 54, which permits a portion of the module rail 110 to be advanced between a gap 68 defined between the pair of legs 56 (FIGS. 7 and 8).

The leg 56 defines a tab 70 that extends horizontally in a direction towards the hook 64 and away from the apex 62 of the crown 54. The tab 70 is disposed on the leg 56 at a location where, when in the first, open position, the tab is located above, and in embodiments, abuts a portion of the ledge 34 of the saddle, and when in the second, closed or clamped position, is received within a respective slot of the pair of slots 42 to lock or otherwise inhibit movement of the clip assembly 50 relative to the saddle 12, as will be described in further detail hereinbelow. The leg 56 includes an ear 72 extending from the first end portion 58 of the crown 54 in a direction that is away from the hook 64. When the clip assembly 50 is in the first, open position, the ear 72 is oriented in a vertical direction where the respective ears 72 of the pair of legs 56 is parallel to one another. The ear 72 includes a bore 74 defined therethrough for receipt of the pin 76, which couples the clip 52 and the strap assembly 82 to the saddle 12 via a respective slot of the pair of slots 42.

It is envisioned that the clip 52 may be formed from any suitable resilient material, such as a metal, a polymer, a composite, amongst others. In one non-limiting embodiment, the clip 52 is formed from a resilient sheet material such as galvanized steel. The clip 52 is formed from a unitary piece of material that is worked or otherwise machined to shape to reduce the amount of material and processes required to form the clip 52 than if the clip were formed from multiple pieces of material joined together using fasteners, welding, adhesives, amongst others. As can be appreciated, the clip 52 may be formed using any suitable number of components and by any suitable methods without departing from the scope of the present material.

The pin 76 defines a generally barbell type configuration having a linear center portion 78 interposed between a pair of flanges 80. The linear center portion 78 includes an outer dimension that is configured to be received within the bore 74 of the ear 72 and a respective slot of the pair of slots 42 of the saddle 12 to slidably support the pin 76. Each flange of the pair of flanges 80 includes an outer dimension that is greater than the outer dimension of the linear center portion 78 and greater than the inner dimension of the slot 42 to maintain the pin 76 within the slot 42.

Referring again to FIGS. 1-3 and with additional reference to FIG. 9, the strap assembly 82 includes a pair of straps 84 a T-bolt 86, a barrel 88, and a nut 90. Each strap of the pair of straps 84 is substantially similar to one another and therefore only on strap 84 will be described in detail herein in the interest of brevity. The strap 84 defines a generally lazy "L" shaped profile extending a first end portion 92 (FIG. 3) and a second, opposite end portion 94. Each of the first and second end portions 92, 94 define an eye or loop 96 for receipt of the pin 76 adjacent the first end portion 92 and for receipt of one of the T-bolt 86 or the barrel 88 adjacent the second end portion 94 (FIGS. 3 and 4). As can be appreciated, the loop 96 adjacent the first end portion 92 is rotatably supported on the pin 76 to permit rotational movement of the pair of straps 84 relative to the saddle 12 to accommodate movement or insertion of the torque tube 14 between the pair of straps 84. In this manner, the first end portion 92 of the strap 84 is received within an aperture 98 (FIG. 3) defined through a respective protuberance of the pair of protuberances 24 of the saddle 12. The barrel 88 slidably receives a portion of the T-bolt 86 therethrough and the T-bolt 86 threadably engages the nut 90. In this manner, rotating the nut 90 in a first direction causes the second end portions 94 of each respective strap of the pair of straps 84 to be drawn towards one another to clamp or otherwise secure the torque tube 14 to the saddle 12. Rotation of the nut 90 in a second, opposite direction, permits the second end portions 94 of the pair of straps 84 to expand or otherwise permit the torque tube 14 to move relative to the saddle 12. Although generally described as using a T-bolt 88 and a nut 90, it is envisioned that any suitable components capable of clamping or otherwise securing the torque tube 14 to the saddle 12 may be utilized without departing from the scope of the present disclosure.

With reference to FIGS. 7-10, in operation, the clip assembly 50 and the strap assembly 82 are both placed in the first, open position (FIGS. 7 and 8) such that the pair of legs 56 of the clip 52 are splayed outward. In this first position, the pair of tabs 70 of the clip 52 is disposed above the ledge 34 of the saddle. The module rail 110 is advanced towards the saddle 12 and received within the gap 68 defined by the pair of legs 56 of the clip 52 until a portion of the module rail 110 abuts the apex 62 of the crown 54 (FIG. 8). Continued advancement of the module rail 110 towards the saddle 12 urges the clip assembly 50 towards the saddle 12 and causes the pair of tabs 70 to abut the inner surface 28 of the saddle 12, cause the hooks 64 to be received within a corresponding slot 112 formed within the module rail 110. Further advancement of the module rail 110 towards the saddle 12 causes the tabs 70 to be received within a respective slot of the pair of slots 42 of the saddle 12 to lock the module rail 110 to the saddle 12 (FIGS. 9 and 10). As can be appreciated, portions of the module rail 110 are received within a respective channel 66 of the pair of legs 56 to couple or otherwise secure the support rail to the saddle. In this manner, the hooks 64 and the tabs 70 of the clip assembly 50 cooperate to inhibit vertical or twisting movement of the module rail 110 relative to the saddle 12. With the module rail 110 coupled to the saddle 12, the nut 90 of the strap assembly 82 is rotated in the first direction to cause the pair of straps 84 to be drawn towards one another. Continued rotation of the nut 90 in the first direction causes the pair of straps to 84 to squeeze or otherwise clamp against the torque tube 14 and cause the pair of straps 84 to pull the pair of pins 76, and therefore, the clip assembly 50 towards the torque tube 14 to further secure the module rail 110 to the saddle 12 while also securing the torque tube 14 to the saddle 12 and inhibiting movement of both the module rail 110 and the torque tube 14 relative to the saddle 12. It is envisioned that once the module rail 110 is received within the gap 68 formed between the pair of legs 56 of the clip assembly 50, the nut 90 of the strap assembly 82 may be rotated in the first direction to cause the pair of legs 84 to drawn the pair of pins 76, and therefore, the clip 52, towards the saddle 12 without the need to provide an external force on the module rail 110. As can be appreciated, continued rotation of the nut 90 in the first direction causes the module rail 110 and the torque tube 14 to simultaneously be secured to the saddle 12.

Although generally described as being initially placed in the first, open position, it is envisioned that the clip assembly 50 may initially be placed in the second, closed position. In this manner, as the module rail 110 is advanced towards the saddle 12, portions of the module rail 110 abut or otherwise contact the hooks 64 of the pair of legs 56 of the clip assembly 50. Continued advancement of the module rail 110 towards the saddle 12 causes the pair of legs 56 to splay outward and permit the module rail 110 to be received within the gap 68 formed between the pair of legs 56. At this point, the procedure described hereinabove may be followed to secure the module rail 110 and the torque tube 14 to the saddle 12.

It is envisioned that the tabs 70 may be depressed using an external force to enable the support rail to be removed from the saddle 12. In this manner, an external force is applied to each of the tabs 70 (either incrementally or sequentially) to disengage the tabs 70 from the slots 42 while urging the module rail 110 in a direction that is away from the saddle 12. Since the tabs 70 are depressed and therefore, disengaged from the slots 42, the clip assembly 50 and the module rail 110 are permitted to be urged away from the saddle 12 and release the module rail 110 from the clip assembly 50. It is envisioned that this process may be utilized to remove the module rail 110 entirely or permit adjustments of the position of the module rail 110 relative to the saddle 12.

Figure 11:
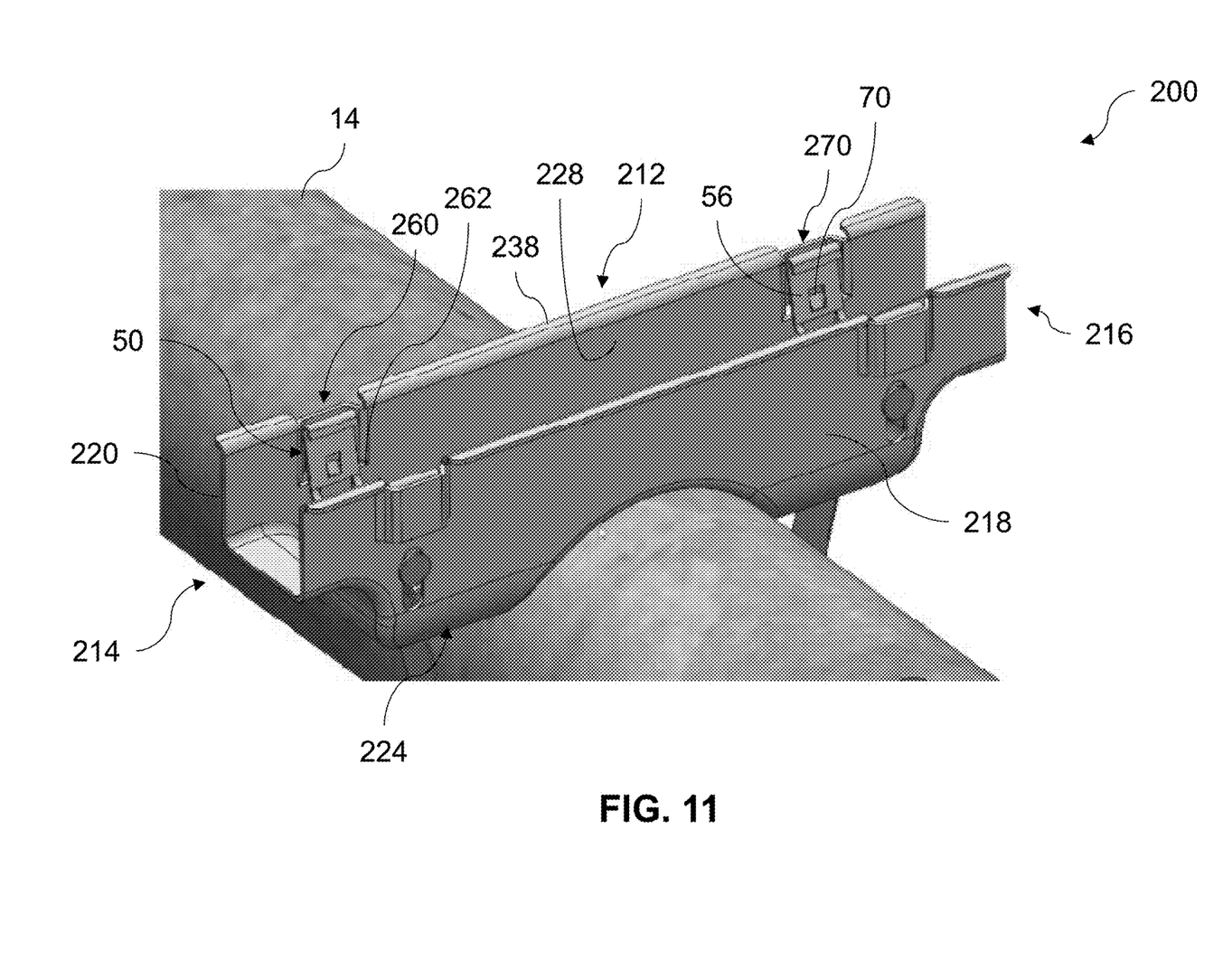
FIG. 11 is a perspective view of another embodiment of a coupling assembly provided in accordance with the present disclosure.

Turning to FIG. 11, another embodiment of a coupling assembly is illustrated and generally identified by reference numeral 200. The coupling assembly 200 is substantially the same as the coupling assembly 10, and therefore, only the differences therebetween will be described in detail herein in the interest of brevity. The saddle 212 of the coupling assembly 200 does not include the pair of cutouts 34, and rather, the first and second side surfaces 218, 220 of extend to the first and second end portions 214, 216. A first pair of pockets 260 is formed adjacent the first end portion 214 and a second pair of pockets 270 is formed adjacent the second end portion 216. The first and second pair of pockets 260, 270 is substantially similar to one another and therefore only the first pair of pockets 260 will be described in detail herein in the interest of brevity.

The first pair of pockets 260 define a generally U-shaped depression formed within the inner surface 228 and extending away from one another such that a distance between each pocket of the first pair of pockets 260 is greater than a dimension between the inner surface adjacent each of the first and second side surfaces 218, 220. Each pocket of the first pair of pockets 260 extends through the upper surface 238 and extends towards the protuberance 224 and terminates at a ledge 262 that transitions from the pocket of the first pair of pockets 260 to the inner surface 228. As can be appreciated, the first pair of pockets 260 provides clearance for the pair of legs 56 of the clip assembly 50 to be placed in the first, open or splayed apart position. The ledge 262 provides a surface against which the tabs 70 of the clip assembly 50 abut to initially maintain the clip assembly 50 in the first, open position. The coupling assembly 200 operates in a substantially similar manner to the coupling assembly 10 and therefore, operation of the coupling assembly 200 will not be described in detail herein in the interest of brevity.

Figure 12:
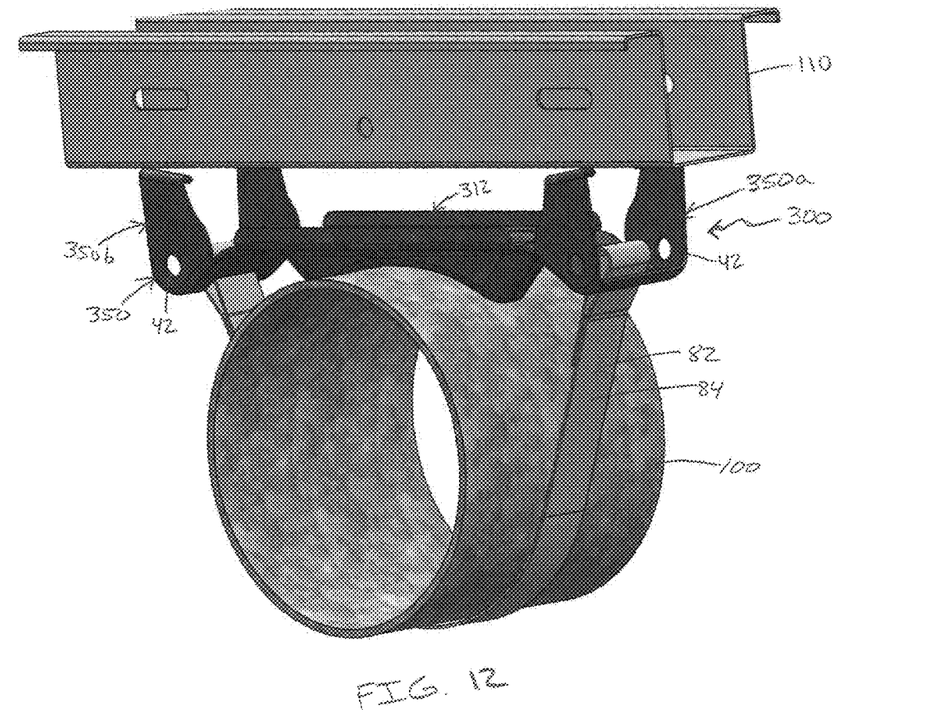
Figure 13:
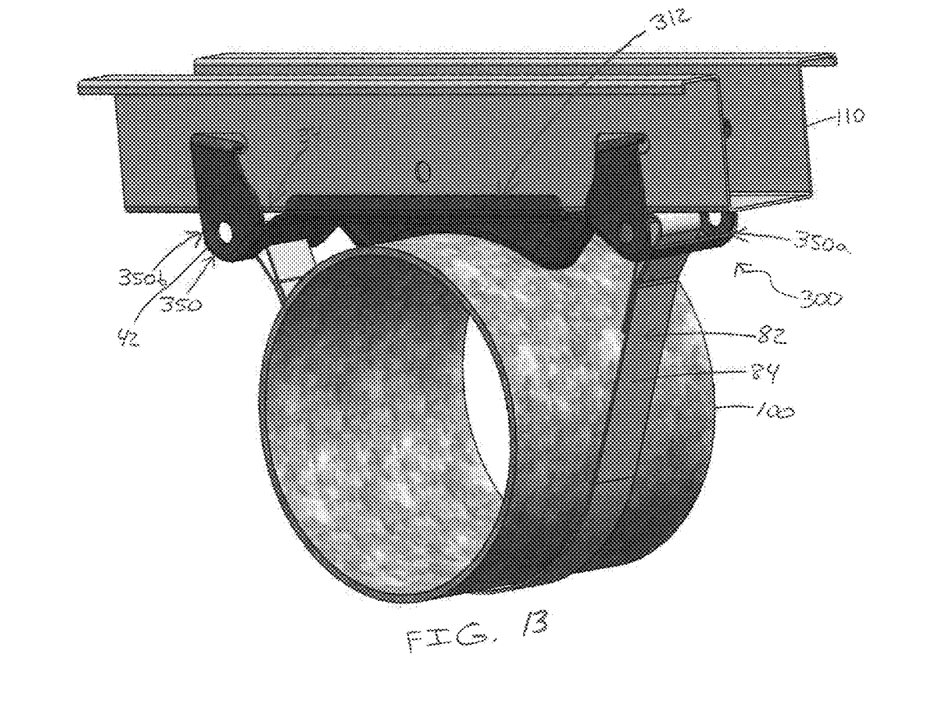
FIG. 13 is a perspective view of the integrated saddle and clip component coupled to the torque tube via the strap assembly and coupled to the module rail via the one or more integral clip assemblies at the integrated saddle and clip component.
Figure 14:
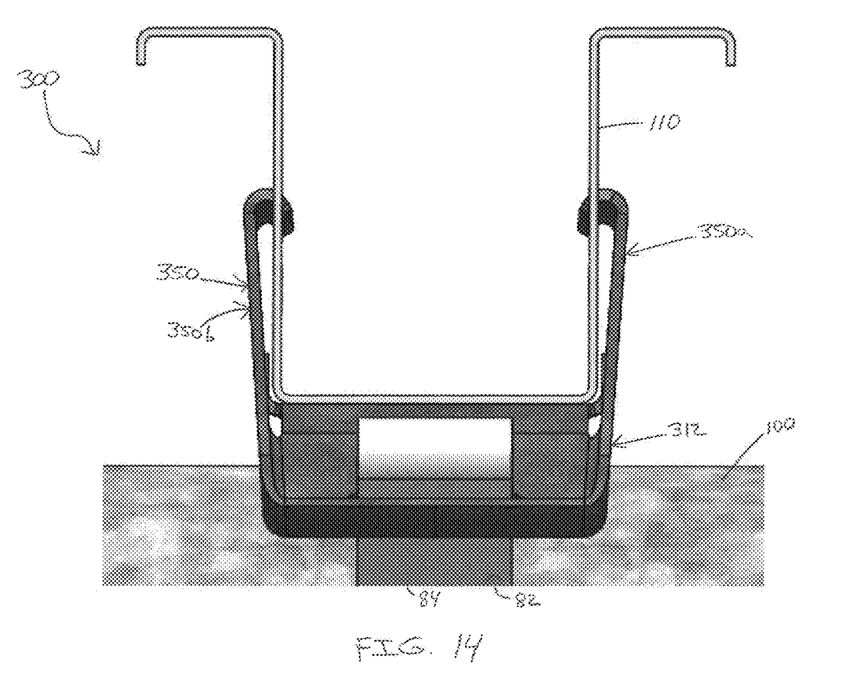
FIG. 14 is a side elevational view of the integrated saddle and clip component, shown at FIG. 13, coupled to the torque tube via the strap assembly and coupled to the module rail via the one or more integral clip assemblies at the integrated saddle and clip component.
Figure 15:
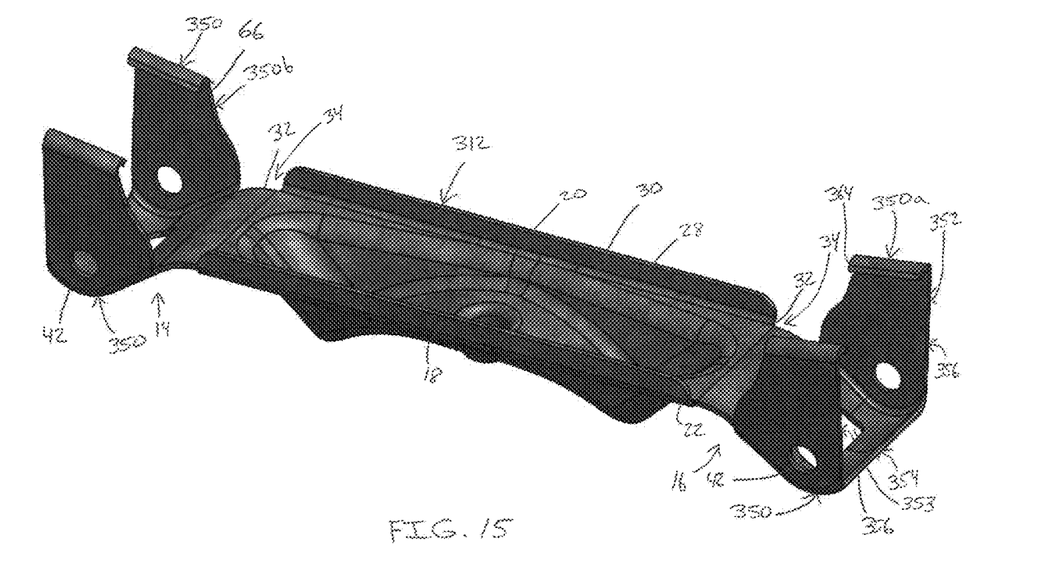
FIG. 15 is a perspective view of the integrated saddle and clip component in isolation.

FIGS. 12-15 illustrate another embodiment of a coupling assembly 300 provided in accordance with the present disclosure. The coupling assembly 300 can be similar to, or the same as, the coupling assembly 10 as disclosed elsewhere herein except as otherwise disclosed here. In particular, the coupling assembly 300 includes one or more clip assemblies 350 that are integrated with saddle component 312. FIG. 12 is a perspective view of integrated saddle and clip component 312 coupled to torque tube 100 via the strap assembly 82 and decoupled from a module rail 110, while FIG. 13 is a perspective view of the integrated saddle and clip component 312 coupled to the torque tube 100 via the strap assembly 82 and coupled to the module rail 110 via the one or more integral clip assemblies 350 at the integrated saddle and clip component 312. FIG. 14 is a side elevational view of the integrated saddle and clip component 312, shown at FIG. 13, coupled to the torque tube 100 via the strap assembly 82 and coupled to the module rail 110 via the one or more integral clip assemblies 350 at the integrated saddle and clip component 312. FIG. 15 is a perspective view of the integrated saddle and clip component 312 in isolation.

The coupling assembly 300 can include the integrated saddle and clip component 312 and the strap assembly 82. The one or more clip assemblies 350 can be integrally formed with the body of the saddle component to form a single workpiece integrated saddle and clip component 312 (e.g., such that the one or more clip assemblies 350 integrally formed with the body of the saddle component are movable relative to a body of the saddle portion of the integrated saddle and clip component 312). The strap assembly 82 can be coupled to the integrated saddle and clip component 312. For instance, as shown here for the illustrated embodiment of the integrated saddle and clip component 312, the strap assembly 82 can be coupled to the integrated saddle and clip component 312 at the pair of clip assemblies 350 portion of the integrated saddle and clip component 312 (e.g., such that, as illustrated, the strap assembly 82 has one end of strap 84 coupled to a first clip assembly 350*a* at the integrated saddle and clip component 312 and another, opposite end of strap 84 coupled to a second clip assembly 350*b* at the integrated saddle and clip component 312). As will be described in further detail elsewhere herein, the saddle portion of the integrated saddle and clip component 312 can be configured to be selectively coupled to the torque tube 100 of a solar tracker (not shown) via the strap assembly 82, and the clip one or more clip assembly 350 (e.g., a pair of clip assemblies 350) portion of the integrated saddle and clip component 312 can be configured to be selectively coupled to the module rail 110, such as a FSLR series-7 (S7) of a photovoltaic solar module (not shown) of the solar tracker via the clip assembly portion 350 of the integrated saddle and clip component 312 to enable mounting of the solar modules on the torque tubes 100 (e.g., via coupling one or more solar modules to the module rail 110).

A body of the saddle portion of the integrated saddle and clip component 312 can be seen at FIG. 15. The saddle portion of the integrated saddle and clip component 312 can include inner surface 28 defining a cavity 30 therein and extending towards the lower surface 22. The cavity 30 can include an interior shape that is generally complimentary to the profile of the lower surface 22. In this manner, the inner surface 28 can define a generally planar surface 32 adjacent each of the first and second end portions 14, 16 that is configured to support or otherwise abut a portion of the module rail 110 of the solar module when the module rail 110 is seated within a portion of the cavity 30. The saddle portion of the integrated saddle and clip component 312 can include a pair of cutouts or reliefs 34 defined through the first and second side surfaces 18, 20 of the saddle portion adjacent each of the first and second end portions 14, 16. The pair of cutouts 34 can be adjacent to the location of the pair of clip assemblies 350 at the body of the integrated saddle and clip component 312. The pair of cutouts 34 can be configured to provide a relative movement function for the pair of clip assemblies 350 relative to the saddle portion. For example, the cutouts 34 can be configured to allow the clip assemblies to flex or rotate relative to the planar surface 32 of the saddle portion.

The integrated saddle and clip component 312 can include one or more pair of slots 42 extending through both the first and second side surfaces 18, 20. The pair of slots 42 can be defined at each of the pair of clip assemblies 350, and the pair of slots 42 can be disposed adjacent each of the pair of cutouts 34. In one non-limiting embodiment, the pair of slots 42 are disposed 200 mm from one another in a direction along the longitudinal axis of the integrated saddle and clip component 312 (e.g., spaced 200 mm apart along a distance traversing across a longitudinal length of the side surface 18 or 20). Each slot of the pair of slots 42 can be configured to slidably retain a respective pin of the clip assembly 50 such that a pin can extend though one slot 42 at one side of the clip assembly 350, though the strap 84 positioned at the clip assembly 350 between opposite sides of the clip assembly, and into the other slot 42 of the pair at the opposite side of the clip assembly 350 such that the pin can act to couple the strap 84 to the clip assembly 350. As can be appreciated, it is envisioned that the saddle may include any number of slots 42 disposed through the first and second side surface 18, 20 without departing from the scope of the present disclosure.

The clip assembly 350 can include a pin (e.g., pin 76 as shown elsewhere herein) and a clip 352. The clip 352 can be configured to be transitioned from a first, open configuration (e.g., FIG. 12) to a second, closed or clamped configuration (e.g., FIGS. 13, 14) and can define a generally U-shaped profile having a crown 354 interposed between a pair of legs 356. When placed in the first, open configuration, the crown 354 can define a generally arcuate profile when the extending between a first end portion and an opposite second end portion. In this manner, a center portion of the crown 354 can define an apex 62, which, as can be appreciated, when present, can cause the crown 354 to act as a biasing element. Each clip 352 can include a strap slot 353, for instance, located between the pair of legs 356, such as at the crown 354 between the pair of legs 356. The mounting features of the S7 module rail 110 can be a snap-fit or quick fit between the module rail 110 and the tracker rail without using any conventional or permanent fastening methods.

A first leg of the pair of legs 356 can be coupled to a first end portion of the crown 354 and the second leg of the pair of legs 356 can be coupled to a second, opposite end portion of the crown 354. In this manner, the pair of legs 356 can be disposed in a mirrored configuration about the crown 354. Each leg 356 can extend out from the crown 354 and terminate at a hooked or otherwise J-shaped configuration 364. In this manner, the hook 364 can curve and extend back towards the crown 354 to define channel 66 for receipt of a portion of the module rail 110, such as disclosed elsewhere herein. When the clip 352 is placed in the first, open position, the leg 356 can be splayed outwards (e.g., away from crown 354). As can be appreciated, by being splayed outwards, the hook 364 of each leg of the pair of legs 356 can be further apart from one another than a portion of each leg of the pair of legs 356 adjacent the crown 54, which permits a portion of the module rail 110 to be advanced between a gap defined between the pair of legs 356.

The clip 352 can be formed from any suitable resilient material, such as a metal, a polymer, a composite, amongst others. In one non-limiting embodiment, the clip 52 is formed from the same material as the saddle component of the integrated saddle and clip component 312 such that the saddle portion and clip 352 portion of the integrated saddle and clip component 312 is formed as a unitary piece of material. The strap assembly 82 can be similar to, or the same as, the strap assembly 82 as disclosed elsewhere herein, for instance, such that the strap assembly 82 can includes strap 84. For example, here strap 84 can be a single strap component 84 that is configured to extend from one side of the integrated saddle and clip component 312 (e.g. from the strap slot 353 at one clip assembly 352a at one end portion of the integrated saddle and clip component 312), around the torque tube 100, and to another side of the integrated saddle and clip component 312 (e.g., to the strap slot 353 at another clip assembly 352b at an opposite end portion of the integrated saddle and clip component 312).

In operation, the one or more clip assemblies 350 and the strap assembly 82 can be placed in the first, open position (e.g., FIG. 12), for instance, such that the pair of legs 356 of the clip 352 are in a first orientation relative to the planar surface 32 at the saddle portion of the integrated saddle and clip component 312 (e.g., the pair of legs are splayed outward and/or at a first skewed angularly orientation relative to the planar surface 32). The module rail 110 can be advanced towards the saddle portion (e.g., advanced toward the planar surface 32) and received within the gap defined between the pair of legs 356 of the clip 352 until a portion of the module rail 110 abuts the crown 354. Continued advancement of the module rail 110 towards the saddle portion can act to urge the clip assembly 350 towards the saddle portion (e.g., toward the planar surface 32) and cause the hooks 364 to be received within a corresponding slot 112 formed within the module rail 110. As can be appreciated, portions of the module rail 110 can be received within a respective channel of the pair of legs 356 to couple or otherwise secure the support rail to the saddle portion of the integrated saddle and clip component 312. In this manner, the hooks 364 of the clip assembly 350 can cooperate to inhibit vertical or twisting movement of the module rail 110 relative to the saddle portion of the integrated saddle and clip component 312. With the module rail 110 coupled to the saddle portion, the strap assembly 82 can be actuated to tighten the strap assembly 82 around the torque tube 100 to further secure the module rail 110 to the saddle portion of the integrated saddle and clip component 312 while also securing the torque tube 100 to the integrated saddle and clip component 312 and helping to inhibit movement of both the module rail 110 and the torque tube 100 relative to the saddle portion (e.g., relative to the planar surface 32) of the integrated saddle and clip component 312.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

What is claimed is:

1. A coupling system for use with a solar tracker, comprising:
   a saddle defining a U-shaped profile extending between a first end portion and a second, opposite end portion, the saddle defining a channel having an open upper portion and extending through each of the first end portion and the second end portion, the channel configured to selectively receive a module rail of a solar module, wherein a slot is defined through the first and second side surfaces adjacent the first end portion; and
   a clip assembly slidably supported within the channel of the saddle, the clip assembly including a clip having a generally U-shaped profile defining a crown interposed between a pair of legs, each of the pair of legs extending from the crown and terminating at a respective hook, wherein an upturned tab is disposed on each leg of the pair of legs, wherein the clip assembly is configured to transition from a first open position, to a second, closed position where an upturned tab of each leg of the pair of legs is received within the slot of the saddle and a hook of each leg of the pair of legs is received within a respective slot formed in the module rail to selectively couple the module rail to the saddle.

2. The coupling system according to claim 1, wherein the crown of the clip assembly defines an arcuate profile defining an apex extending into a gap formed between the pair of legs.

3. The coupling system according to claim 1, wherein each hook of the pair of legs defines a channel configured to receive a portion of the module rail, wherein when the clip assembly is placed in the second, closed position, the channel urges the module rail towards the saddle and inhibits movement of the module rail relative to the saddle.

4. The coupling system according to claim 1, wherein the saddle includes a cutout defined through the first and second side surfaces of the saddle and adjacent the first end portion, the cutout extending in a direction transverse to a longitudinal axis defined through the first and second end portions and through an upper surface of the saddle, wherein the cutout permits an upper portion of the pair of legs of the clip to splay outwards and extend past a respective first side surface and second side surface of the saddle.

5. The coupling system according to claim 4, wherein the cutout of the saddle extends away from the upper surface a distance permitting a tab of each respective leg of the pair of legs of the clip to extend past a respective first and second end surface of the saddle.

6. The coupling system according to claim 1, wherein the clip assembly further includes a pin operably coupled to the clip and slidably supported within the slot of the saddle, the pin defining a pair of opposed flanges inhibiting movement of the pin in a direction transverse to a longitudinal axis defined through the first and second end portions of the saddle.

7. The coupling system according to claim 6, wherein the clip defines a pair of ears extending from each respective leg of the pair of legs extending in a direction away from the hooks, each ear of the pair of ears defining a bore for receipt of the pin.

8. The coupling system according to claim 1, wherein when in the first, open position, each leg of the pair of legs is splayed in an outward direction where a distance between an upper portion of each leg of the pair of legs is greater than a length of the crown.

9. The coupling system according to claim 1, wherein when in the first, open position, the first leg of the pair of legs is parallel to the second leg of the pair of legs.

10. A coupling system for use with a solar tracker, comprising:
a saddle defining a U-shaped profile extending between a first end portion and a second, opposite end portion, an inner surface of the saddle defining a channel having an open upper portion and extending through each of the first end portion and the second end portion, wherein the inner surface of the saddle defines a pair of pockets where an inner dimension extending between the pair of pockets is greater than an inner dimension of the remaining portion of the channel; and
a clip assembly slidably supported within the channel of the saddle, the clip assembly including a clip having a generally U-shaped profile defining a crown interposed between a pair of legs, wherein a portion of each leg of the pair of legs is selectively received within a respective pocket of the pair of pockets, each leg of the pair of legs including an upturned tab, wherein the clip assembly is configured to transition from a first open position wherein each upturned tab is received within a respective pocket of the pair of pockets, to a second, closed position where each upturned tab is positioned within the remaining portion of the channel having a smaller inner dimension than the inner dimension extending between the pair of pockets.

11. The coupling system according to claim 10, wherein saddle includes a slot formed through the first side surface and the second side surface, the slot configured to selectively receive the upturned tab of the pair of legs when the clip assembly is placed in the second, closed position.

12. The coupling assembly according to claim 10, wherein each leg of the pair of legs of the clip assembly terminates at a hook extending into a gap formed between the pair of legs.

13. The coupling assembly according to claim 12, wherein each hook of the pair of legs defines a channel for receipt of a portion of a module rail of a solar module.

14. The coupling assembly according to claim 10, wherein the crown defines an arcuate profile extending between the pair of legs.

15. The coupling assembly according to claim 10, wherein the pair of legs are splayed in a direction extending from the crown.

* * * * *